(12) United States Patent
Yamada

(10) Patent No.: US 7,007,181 B2
(45) Date of Patent: Feb. 28, 2006

(54) MICROCONTROLLER

(75) Inventor: Masanori Yamada, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 478 days.

(21) Appl. No.: 10/259,643

(22) Filed: Sep. 30, 2002

(65) Prior Publication Data
US 2003/0200470 A1 Oct. 23, 2003

(30) Foreign Application Priority Data
Apr. 23, 2002 (JP) .............................. 2002-120554

(51) Int. Cl.
G06F 1/32 (2006.01)
(52) U.S. Cl. ...................... 713/320; 713/323; 713/324; 713/601
(58) Field of Classification Search ................ 713/320, 713/323, 324, 601
See application file for complete search history.

(56) References Cited

U.S. PATENT DOCUMENTS 5,699,553 A * 12/1997 Iino et al. .................... 711/151
6,240,522 B1 * 5/2001 Stufflebeam ................. 713/324
6,342,795 B1 * 1/2002 Ohta ............................ 327/99
6,496,938 B1 * 12/2002 Fry et al. ..................... 713/322

FOREIGN PATENT DOCUMENTS

| JP | 59-121519 | 7/1984 |
| JP | 64-086224 | 3/1989 |
| JP | 06-161938 | 6/1994 |
| JP | 06-161938 | * 10/1994 |

* cited by examiner

Primary Examiner—Thomas Lee
Assistant Examiner—Vincent Tran
(74) Attorney, Agent, or Firm—Rabin & Berdo, P.C.

(57) ABSTRACT

To provide a microcontroller having a function for stopping supply of a clock signal to a slave block and a function for properly stopping the access to a slave block to which supply of a clock signal is stopped. A microcontroller of the present invention has a master block 101 for controlling the whole microcontroller, slave blocks 102 and 103 to be controlled by the master block 101, clock-signal control means 106 and 107 for controlling supply/stop of a clock signal in response to a clock control signal output from the master block 101, and a default slave block 104 for outputting a response signal RESP instead of a slave block to which supply of a clock signal is stopped.

2 Claims, 8 Drawing Sheets

FIG.2

| RESPONSE SIGNAL | STATE |
|---|---|
| 00 | NO ACCESS "NO" |
| 01 | NORMAL END "OK" |
| 10 | ABNORMAL END "ERR" |
| 11 | RESERVED |

MICROCONTROLLER

BACKGROUND OF THE INVENTION

The present invention relates to a microcontroller, particularly to a microcontroller having a clock-signal supply/stop function.

DESCRIPTION OF THE RELATED ART

A conventional microcontroller (hereafter referred to as microcontroller) is constituted by a master block such as a CPU, a slave block to be controlled by the master block, and clock-signal control means for controlling supply/stop of a clock signal to the slave block. The clock-signal control means controls supply/stop of a clock signal in response to a clock control signal (clock-stop request signal) output from the master block. Thus, in the case of a conventional microcontroller, power consumption is reduced by stopping supply of a clock signal to a slave block requiring no clock signal. Moreover, in the case of a conventional microcontroller, when access is completed, a slave block outputs a response signal showing that access is completed to a master block and the master block completes the access operation by receiving the response signal.

However, in the case of a conventional microcontroller, when a master block accesses a slave block to which supply of a clock signal is stopped, the master block continues the access operation because the inactivated slave block cannot output a response signal. Therefore, the microcontroller consumes unnecessary power as a whole because only the master block continues the access operation without performing a predetermined processing and thereby, a problem occurs that it is impossible to reduce power consumption.

SUMMARY OF THE INVENTION

A microcontroller of the present invention is made to solve the above problems. A typical microcontroller of the present invention has response means for outputting a response signal showing that the access to a functional block to which supply of a clock signal is stopped is abnormal instead of the functional block when the functional block is accessed.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings:

FIG. 2 is a table showing the relation between logical value of response signal RESP and completed state of bus access;

DETAILED DESCRIPTION OF THE PREFERRED EMBODIMENTS

Embodiments of the present invention are described below by referring to the accompanying drawings.

(First Embodiment)

Figure 1:
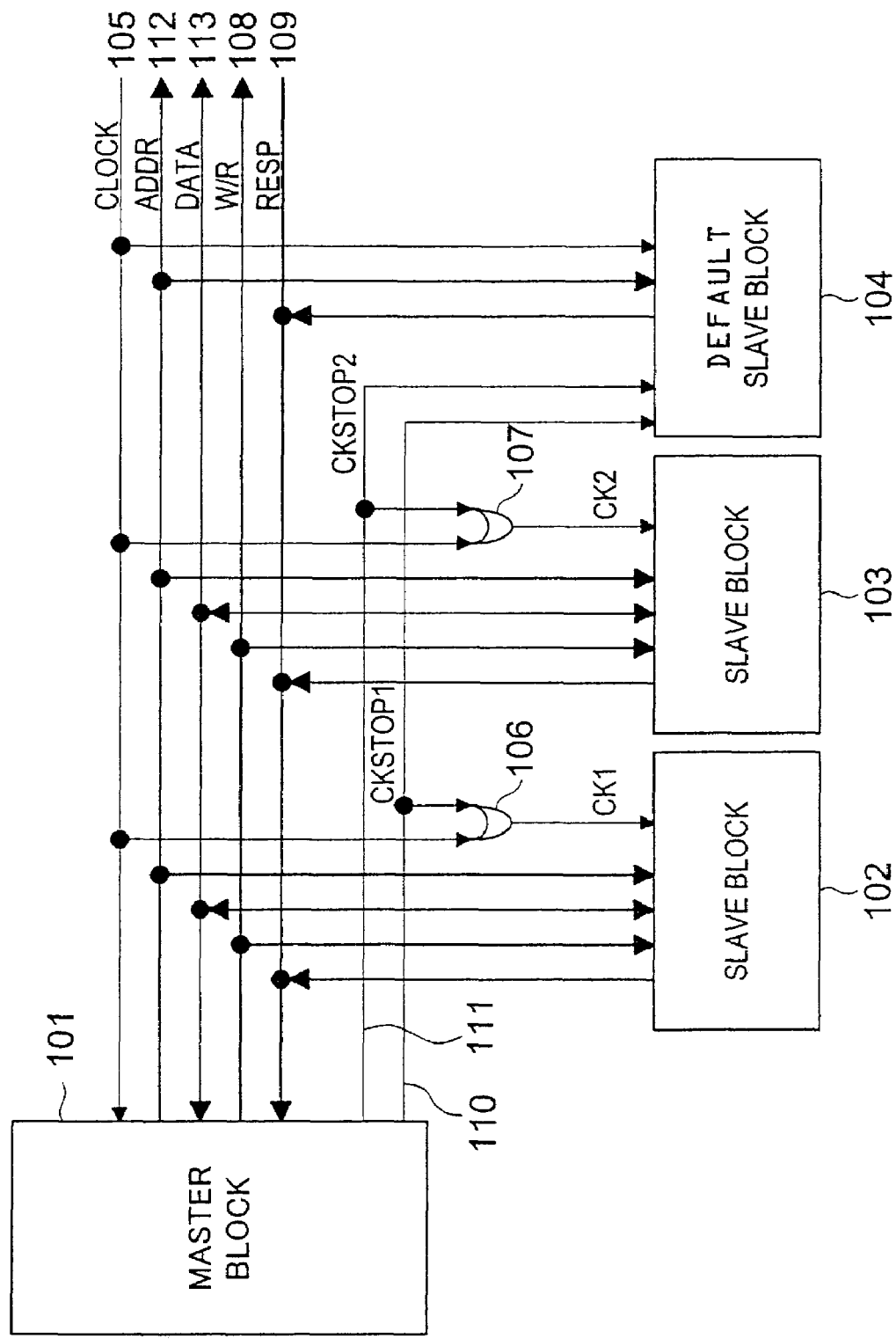
FIG. 1 is a circuit block diagram showing a configuration of a microcontroller of first embodiment of the present invention.

FIG. 1 is a circuit block diagram showing a configuration of the microcontroller of the first embodiment of the present invention. The microcontroller of this embodiment is provided with a master block 101 for controlling the whole microcontroller, a plurality of functional blocks (slave blocks 102 and 103) for executing predetermined functions, clock-signal control means 106 and 107 for selectively supplying clock signals CLOCK to the functional blocks, and response means (default slave block 104) for outputting a response signal RESP instead of a functional block to which supply of a clock signal is stopped. The master block 101 and the slave blocks 102 and 103 are connected each other by an address signal line 112, data signal line 113, read/write signal line 108, and response signal line 109. Moreover, the master block 101 and default slave block 104 are connected each other by the address signal line 112 and response signal line 109.

The master block 101 is a central processing unit (CPU) or the like. The master block 101 generates an address signal ADDR related with each functional block and transmits the signal ADDR to each functional block through the address signal line 112. In this case, the address signal ADDR is also transmitted to the default slave block 104 through the address signal line 112. Moreover, the master block 101 transfers a data signal DATA to and from each functional block through the data signal line 113. Furthermore, the master block 101 generates a read/write signal W/R for designating a read cycle or write cycle and transmits the signal W/R to each functional block through the read/write signal line 108. Furthermore, the master block 101 generates clock control signals (clock-stop request signals) CKSTOP1 and CKSTOP2 for designating supply/stop of the clock signal and transmits the signals to the clock-signal control means 106 and 107 through the clock control signal lines 110 and 111. This embodiment designates supply of a clock signal when logical values of the clock control signals CKSTOP1 and CKSTOP2 are equal to "0" and designates stop of supply a clock signal when logical values of the clock control signals CKSTOP1 and CKSTOP2 are equal to "1". In this case, the logical value "1" of a clock control signal corresponds to the potential of a high level (hereafter referred to as "H") and the logical value "0" of the clock control signal corresponds to the potential of a low level (hereafter referred to as "L").

The functional blocks (slave blocks 102 and 103) are memories or the like. The slave blocks 102 and 103 respectively output a response signal RESP showing the completed state of a bus access to the master block 101 through the response signal line 109. The response signal RESP is described below by referring to FIG. 2. FIG. 2 is a table showing relations between logical values of response signals RESP and completed states of bus accesses. In the case of this embodiment, a response signal RESP is constituted by 2 bits. A response signal RESP shows "no access 'NO'" when it has a logical value "00", "normal end 'OK'" when it has a logical value "01", "abnormal end 'ERR'" when it has a logical value "10", and "reserved" when it has a logical value "11".

The clock-signal control means 106 and 107 (shown in FIG. 1) control supply/stop of clock signals to the slave blocks 102 and 103 in response to the clock control signals CKSTOP1 and CKSTOP2 generating at the master block 101. The clock-signal control means 106 and 107 are respectively constituted by a logical-sum circuit (OR circuit). Hereafter, the clock-signal control means 106 and 107 are referred to as OR circuits 106 and 107. The clock control signal CKSTOP1 is input to one of two input terminals of the OR circuit 106 and a clock signal CLOCK is input to the other of the input terminals. The output signal CK1 of the OR circuit 106 is supplied to the slave block 102. The OR circuit 106 outputs the clock signal CK1 having the same waveform as the clock signal CLOCK when he clock control signal CKSTOP1 is kept at "L" (logical value "0"), that is, when designating supply of a clock signal and outputs a signal of "H" (logical value "1") when the clock control signal CKSTOP1 is kept at "H" (logical value "1") (when designating stop of supply of a clock signal). That is, when the clock control signal CKSTOP1 is kept at "H" (logical value "1"), supply of a clock signal to the slave block 102 is stopped.

Moreover, the clock control signal CKSTOP2 is input to one of two input terminals of the OR circuit 107 and a clock signal CLOCK is input to the other of the input terminals. The output signal CK2 of the OR circuit 107 is supplied to the slave block 103. The OR circuit 107 outputs the clock signal CK2 having the same waveform as a clock signal CLOCK when the clock control signal CKSTOP2 is kept at "L" (logical value "0"), that is when designating supply of a clock signal and outputs a signal of "H" (logical value "1") when the clock control signal CKSTOP2 is kept at "H" (logical value "1") (when designating stop of supply of a clock signal). That is, when the clock control signal CKSTOP2 is kept at "H" (logical value "1"), supply of a clock signal to the slave block 103 is stopped.

The default slave block 104 outputs a response signal RESP to the master block 101 in accordance with the address signal ADDR and the clock control signal CKSTOP1 or CKSTOP2. The default slave block 104 outputs a response signal RESP "10" (abnormal end "ERR") to the master block 101 instead of the slave block 102 when supply of the clock signal CK1 to the slave block 102 is stopped, that is, when the clock control signal CKSTOP1 is kept at "H" (logical value "1"). Moreover, the default slave block 104 outputs the response signal RESP "10" (abnormal end "ERR") to the master block 101 instead of the slave block 103 when supply of the clock control signal CKSTOP2 to the salve block 103 is stopped, that is, when the clock control signal CKSTOP2 is kept at "H" (logical value "1").

Figure 3:
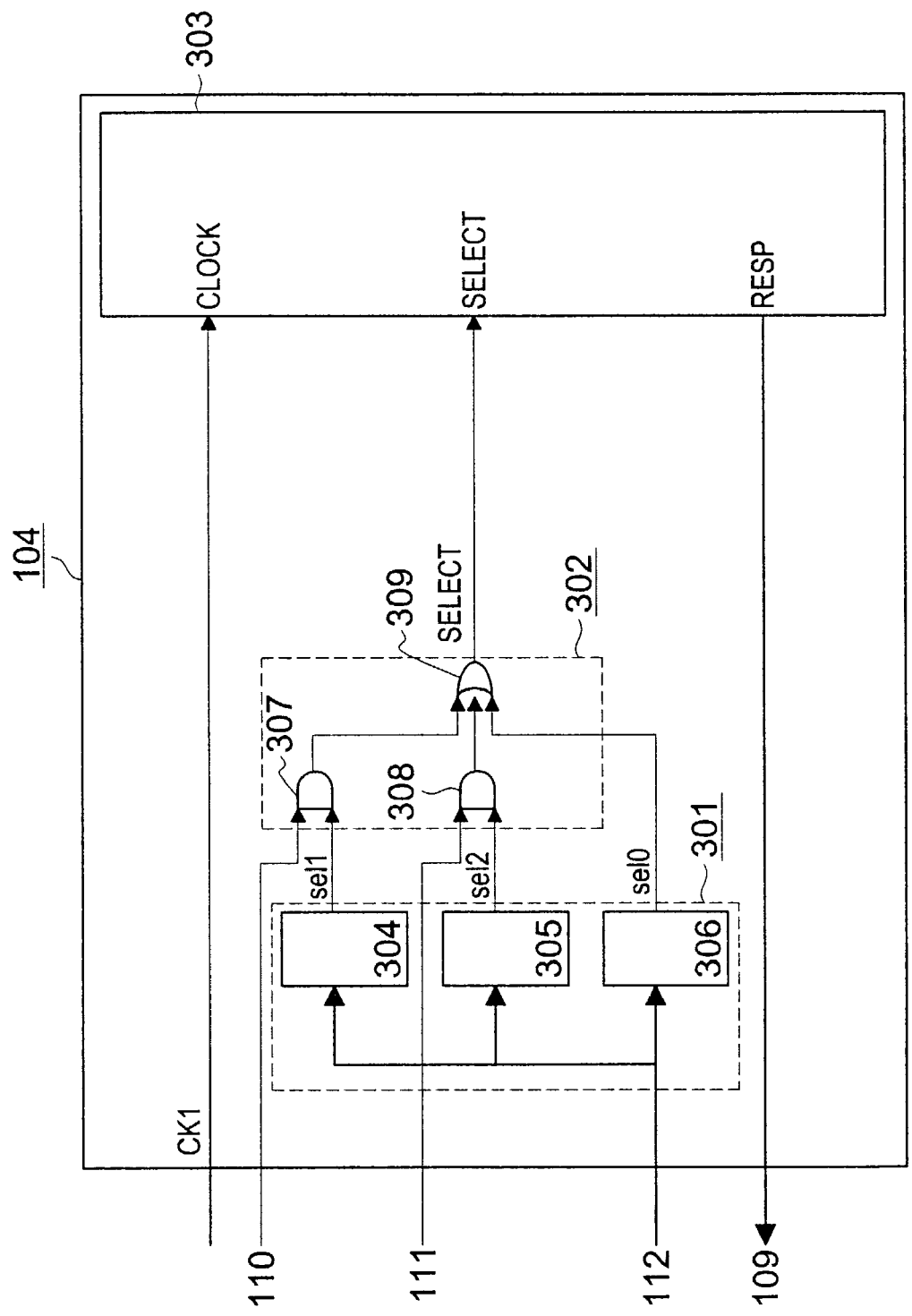
FIG. 3 is a circuit block diagram showing a configuration of the default slave block 104 of the microcontroller shown in FIG. 1.

The default slave block 104 is more minutely described below by referring to FIG. 3. FIG. 3 is a circuit block diagram showing a configuration of the default slave block 104 of the microcontroller shown in FIG. 1. The default slave block 104 is constituted by decoding means (decoding section 301) for decoding the address signal ADDR, a logical-circuit section 302 for outputting a SELECT signal in accordance with the clock control signals CKSTOP1 and CKSTOP2 and output signals sel0 to sel2 of the decoding section 301, and a functional block 303 for outputting a response signal RESP in response to the SELECT signal.

The decoding section 301 is constituted by decoding circuits 304, 305, and 306. In the case of this embodiment, the decoding circuit 304 outputs a sel1 signal of "H" (logical value "1") when the address signal ADDR corresponds to the slave block 102 (FIG. 1) and outputs a sel1 signal of "L" (logical value "0") when the address signal ADDR does not correspond to the slave block 102. The decoding circuit 305 outputs a signal of "H" (logical value "1") as the sel2 signal when the address signal ADDR corresponds to the slave block 103 and outputs a sel2 signal of "L" (logical value "0") when the address signal ADDR does not correspond to the slave block 103. The decoding circuit 306 outputs a sel0 signal of "H" (logical value "1") when the address signal ADDR does not correspond to the slave block 101 or 102 and outputs a sel0 signal of "L" (logical value "0") when the address signal ADDR corresponds to either of the slave blocks 101 (FIG. 1) and 102 (FIG. 1).

The logical circuit section 302 is constituted by logical-product circuits (AND circuits) 307 and 308 and a logical-sum circuit (OR circuit) 309. The AND circuit 307 uses the clock control signal CKSTOP1 and sel1 signal as inputs and the AND circuit 308 uses the clock control signal CKSTOP2 and sel2 signal as inputs. Moreover, the OR circuit 309 uses an output signal of the AND circuit 307, output signal of the AND circuit 308, and output the sel0 of the decoding circuit 306 as inputs and outputs a result of OR operation to the functional block 303 as a SELECT signal. The SELECT signal becomes "H" (logical value "1") in any one of the following three cases in which the clock control signal CKSTOP1 is kept at "H" (logical value "1") and the sel1 is kept at "H" (logical value "1", in which the clock control signal CKSTOP2 is kept at "H" (logical value "1") and the signal sel2 is kept at "H" (logical value "1"), and in which the signal sel0 is kept at "H" (logical value "1"). However, when the SELECT signal does not correspond to any one of the above three cases, it becomes "L" (logical value "0"). That is, the SELECT signal becomes "H" (logical value "1") in either of the following three cases in which the slave block 102 (FIG. 1) to which supply of the clock signal CK1 is stopped is accessed, in which the slave block 103 (FIG. 1) to which supply of the clock signal CK2 is stopped is accessed, and in which a functional block corresponding to the address signal ADDR is not present. However, when the SELECT signal does not correspond to any one of these cases, it become "L" (logical value "0"). The functional block 303 outputs a response signal RESP "10" (abnormal end "ERR") when the SELECT signal is kept at "H" (logical value "1").

Figure 4:
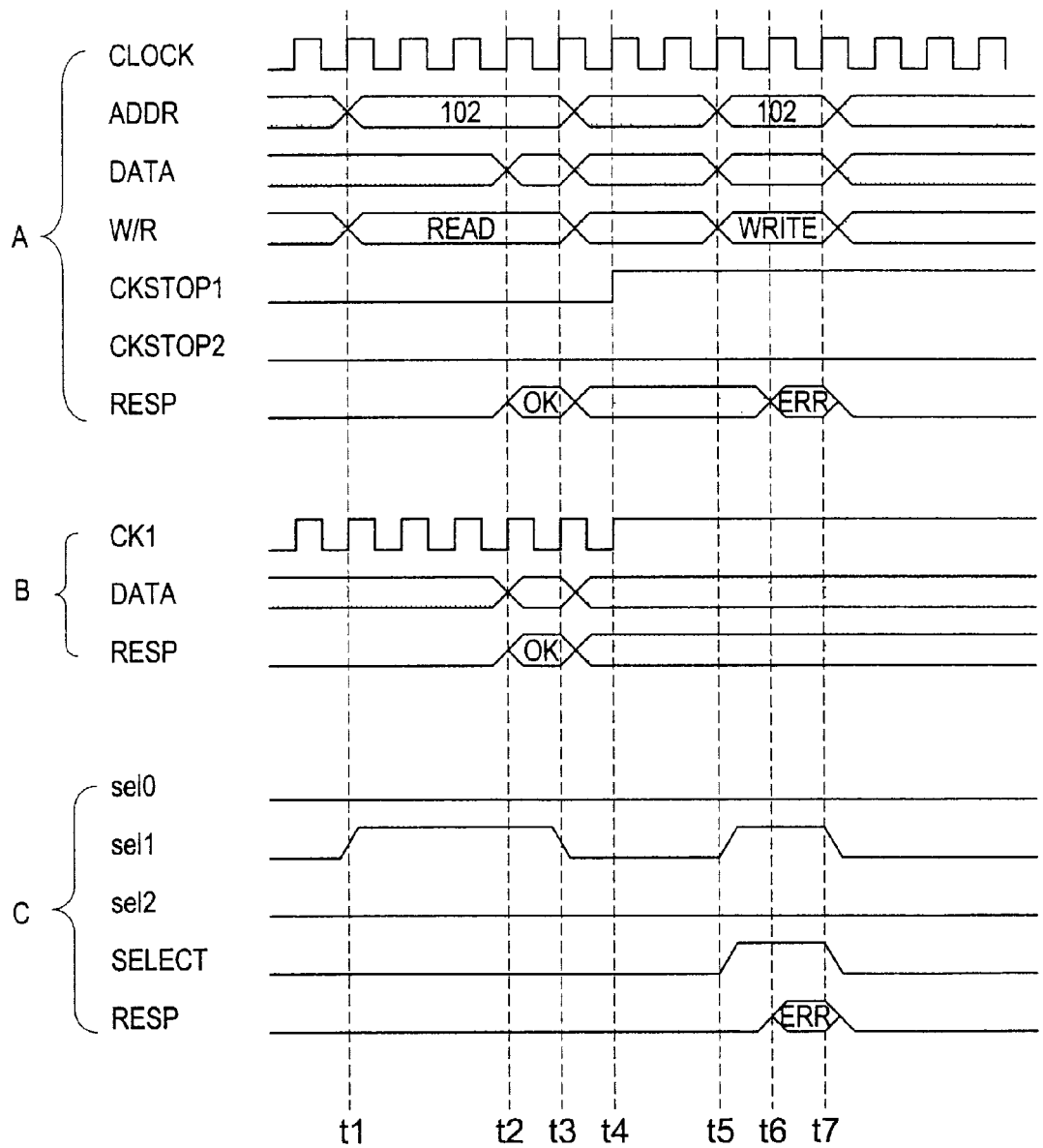
FIG. 4 is an operation waveform diagram showing operations of the microcontroller of the first embodiment.

Then, operations of the microcontroller of this embodiment are described below by referring to FIG. 4. FIG. 4 is a waveform diagram showing operations of the microcontroller of the first embodiment. FIG. 4 shows a clock signal CLOCK, input/output signals (shown by A in FIG. 4) of the master block 101, input/output signals (shown by B in FIG. 4) of the slave block 102, and internal signals (shown by C in FIG. 4) of the default slave block 104 in order from the top. The horizontal direction of FIG. 4 shows time. The clock control signal CKSTOP1 is kept at "L" (logical value "0") up to the time t4 and then kept at "H" (logical value "1") after the time t4. That is, the clock signal CK2 is supplied to the slave block 102 up to the time t4 and supply of the clock signal CK2 to the slave block 102 is stopped after the time t4 (CK1). Cases are described below in which access to the slave block 102 by the master block 101 normally ends (time t1 to time t3) and access to the slave block 102 by the master block 101 abnormally ends (time t5 to time t7).

At the time t1, an address signal ADDR corresponding to the slave block 102 and a read/write signal designating that "read access" are output from the master block 101 and read cycle for the master block 102 is started. In this case, the clock control signal CKSTOP1 is kept at "L" (logical value "0") and the clock signal CK1 is supplied to the slave block 102. The master block 102 is operating because the clock signal CK1 is supplied.

The sell signal of the default slave block 104 becomes "H" (logical value "1") because the address signal ADDR has an address corresponding to the slave block 102 but the SELECT signal remains at "L" (logical value "0") because the clock control signal CKSTOP1 is kept at "L" (logical value "0").

At the time t2, because data is normally output from the slave block 102, the slave block 102 outputs a response signal RESP of "01" (normal end "OK"). At the time t3, the read cycle normally ends.

At the time t4, the clock control signal CKSTOP1 of "H" (logical value "1") is output from the master block 101. Because the clock control signal CKSTOP1 becomes "H" (logical value "1"), the output signal CK 1 of the OR circuit 106 maintains "H" (logical value "1"). That is, because the clock control signal CKSTOP1 becomes "H" (logical value "1"), supply of the clock signal CK1 to the slave block 102 is stopped. The slave block 102 becomes an inactive state (non-operating state) because supply of a clock signal is stopped.

At the time t5, an address signal ADDR corresponding to the slave block 102 and a read/write signal R/W for designating "write access" are output from the master block 101. However, because the slave block 102 is kept in an inactive state, it cannot capture data or cannot output a response signal RESP of "10" (abnormal end "ERR") showing that write access is abnormal. In this case, because the address signal ADDR corresponds to the slave block 102 in the default slave block 104, he sell signal becomes "H" (logical value "1"). The AND circuit 307 outputs a SELECT signal of "H" (logical value "1") in accordance with the sell signal of "H" (logical value "1") and clock control signal CKSTOP1 of "H" (logical value "1").

At the time t6, the functional block 303 outputs a response signal RESP of "10" (abnormal end "ERR") in response to a SELECT signal of "H" (logical value "1"). Thus, the default slave block 104 outputs a response signal RESP showing that write access is abnormal (error) to the master block 101 instead of the slave block 102 to which supply of the clock signal CK2 is stopped.

At the time t7, the master block 101 completes the write access to a slave block in response to the response signal RESP of "10" (abnormal end "ERR") output from the default slave block 104.

As described above, the microcontroller of this embodiment has response means (default slave block 104) for outputting a response signal RESP showing that access to a functional block (e.g. slave block 102) to which supply of a clock signal is stopped is abnormal when the functional block is accessed instead of the functional block. Therefore, even if the functional block to which supply of a clock signal is stopped is accessed, it is possible to stop the access operation of a master block (e.g. CPU). That is, the microcontroller of this embodiment has the response means (default slave block 104) described above. Therefore, when a functional block to which supply of a clock signal is stopped is accessed, it is possible to prevent the power when the master block continues the access operation from being consumed and thereby reduce power consumption.

(Second Embodiment)

Figure 5:
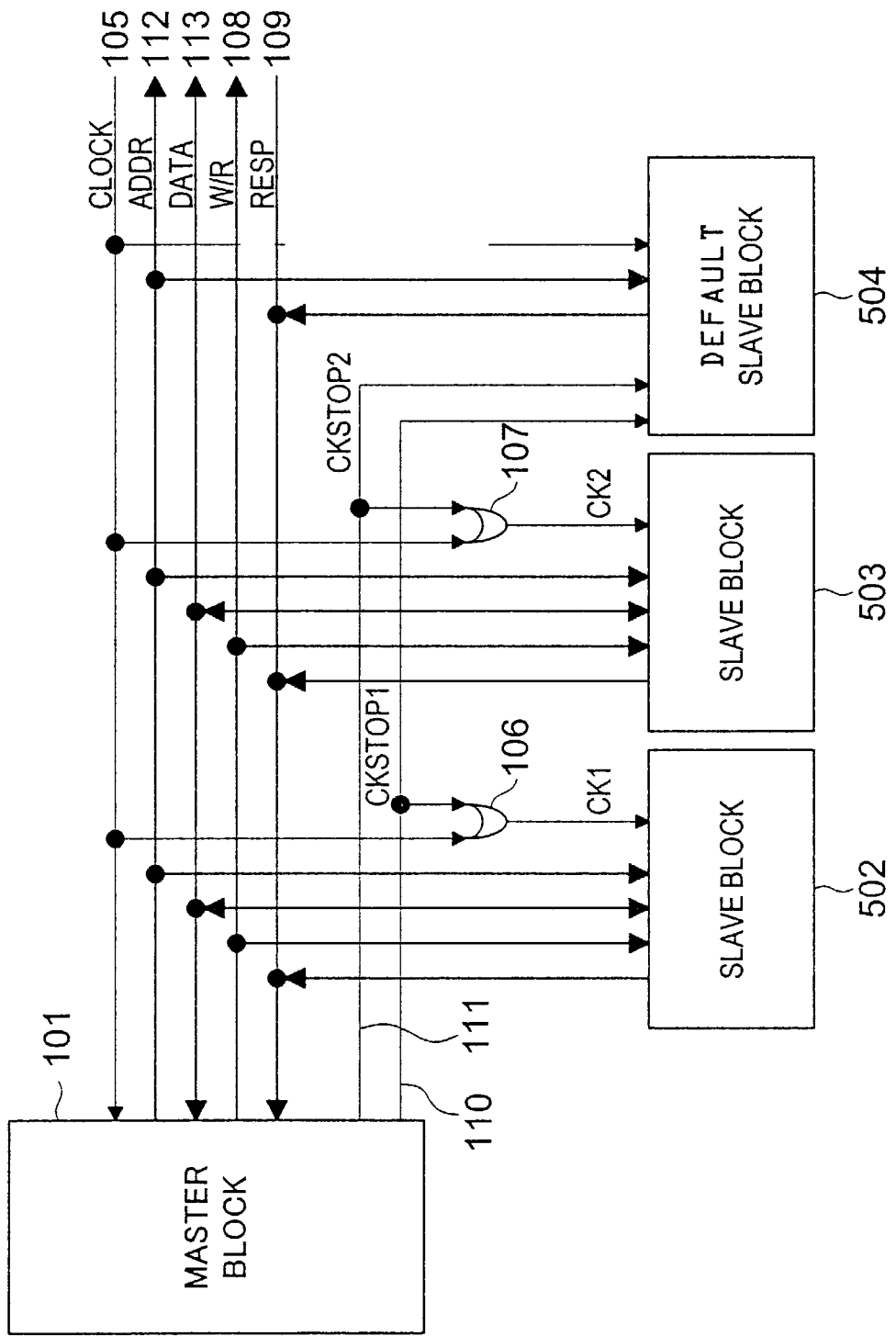
FIG. 5 is a circuit block diagram showing a configuration of a microcontroller of second embodiment of the present invention.

Then, the second embodiment of the present invention is described. FIG. 5 is a circuit block diagram showing a configuration of the microcontroller of the second embodiment of the present invention. The microcontroller of this embodiment is different from the microcontroller of the first embodiment shown in FIG. 1 in that response means is used which is able to output a response signal RESP even if supply of a clock signal is stopped is provided for each of functional blocks (slave blocks 502 and 503). The default slave block 504 outputs a response signal RESP showing that access is abnormal (error) only when a functional block corresponding to an address signal ADDR output from the master block 101 is not present.

Figure 6:
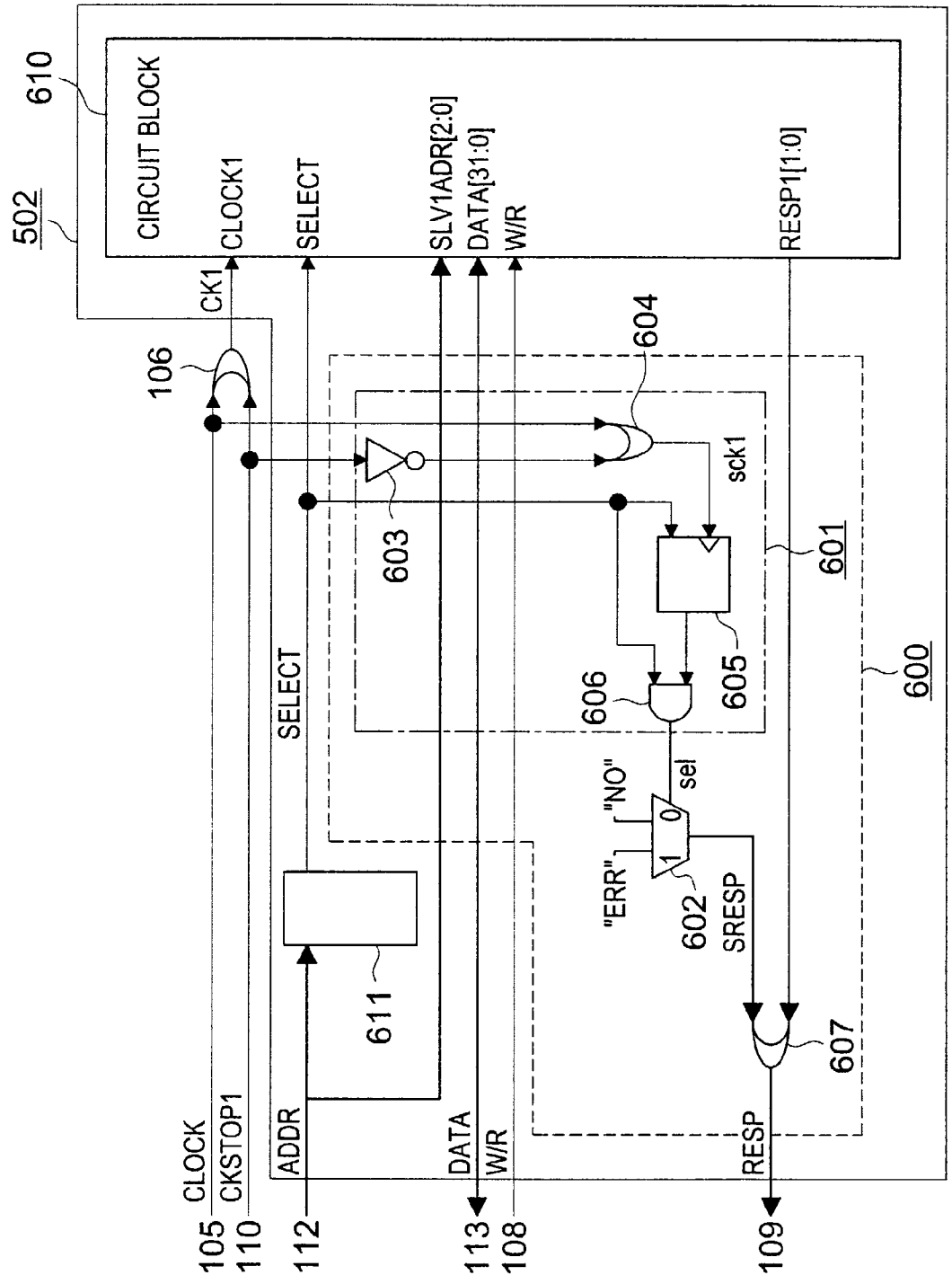
FIG. 6 is a circuit diagram showing a configuration of a slave block of the microcontroller of the second embodiment of the present invention.

Then, the slave block 502 is described below in detail by referring to FIG. 6. FIG. 6 is a circuit diagram showing a configuration of a slave block of the microcontroller of the second embodiment of the present invention. The slave block 503 also has the same configuration as the slave block 502. The slave block 502 is constituted by further providing a stop control section 600 for the slave block 102 of the first embodiment. That is, the slave block 502 is constituted by a decoding circuit 611 for decoding an address signal ADDR, a circuit block 610 for executing predetermined functions, and the stop control section 600 for outputting the response signal RESP instead of the circuit block 610. The stop control section 600 is constituted by a selection-signal generation section 601 for generating a selection signal se1 in accordance with the clock control signal CKSTOP1 and a decoding result (SELECT signal) of an address signal ADDR output from the decoding circuit 611, a selection circuit 602 for selecting and outputting either of a fixed value (in this case, abnormal end "ERR") showing the completed state of bus access or the completed state of bus access (no access "NO") in response to the selection signal se1, and a response-signal output circuit 607 for outputting a response signal RESP.

The selection-signal generation section 601 is constituted by an inverter 603 for inverting and outputting the clock control signal CKSTOP1, a logical-sum circuit (OR circuit) 604 for performing the OR operation between a clock signal CLOCK and an output signal of the inverter 603, a flip-flop circuit (hereafter referred to as F/F circuit) 605 for outputting a signal in accordance with a SELECT signal which is a decoding result of an address signal ADDR and an output signal of the OR circuit 604, and a logical-product circuit (AND circuit) 606 for performing an AND operation in accordance with a SELECT signal and an output signal of the F/F circuit 605 and outputting the result to the selection circuit 602 as the selection signal se1.

The selection-signal generation section 601 outputs the selection signal se1 for directing the selection circuit 602 to output a signal showing completion of access (in this case, abnormal end "ERR") when the master block 101 accesses the slave block 502 to which supply of the clock signal CK1 is stopped. In a case other than the above case, the selection-signal generation section 601 outputs the selection signal se1 for directing the selection circuit 602 to output an access completed state (no access "NO"). Specifically, when the clock control signal CKSTOP1 is kept at "H" (logical value "1") and an address signal ADDR corresponds to the slave block 102 (that is, when SELECT signal is kept at "H" (logical value "1")), the section 601 outputs the selection signal se1 of logical value "1". Moreover, for (clock-stop request signal CKSTOP1 and SELECT signal)=(0,0), (0,1), and (1,0), the section 601 outputs the selection signal se1 of logical value "0".

The selection circuit 602 outputs "abnormal end 'ERR'" when the selection signal se 1 has the logical value "1" and outputs "no access 'NO'" when the selection signal se1 has the logical value "0". The OR circuit 607 performs the OR operation between an output signal of the selection circuit 602 and the RESP1 signal of the memory 610 to output the result as a response signal RESP.

Figure 7:
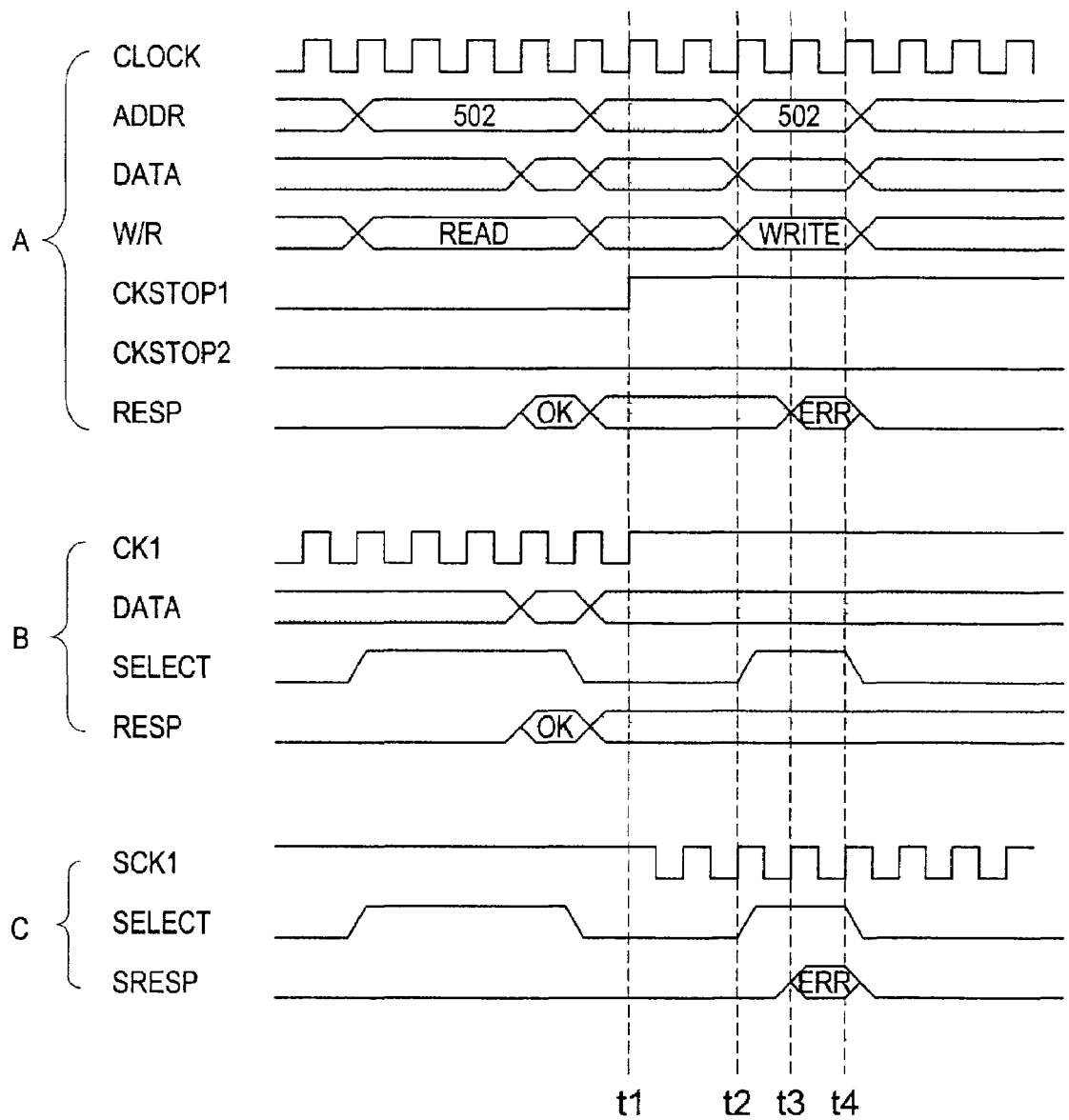
FIG. 7 is an operation waveform diagram showing operations of the microcontroller of the second embodiment of the present invention.

Then, operations of the microcontroller of this embodiment are described below by referring to FIG. 7. FIG. 7 is a waveform diagram showing operations of the microcontroller of the second embodiment of the present invention. FIG. 7 shows a clock signal CLOCK, input/output signals (shown by "A" in FIG. 7) of the master block 101, input/output signals (shown by "B" in FIG. 7) of the slave block 502, and signals (shown by "C" in FIG. 7) of the stop control section in order from the top. The horizontal direction of FIG. 7 shows time. The clock control signal CKSTOP1 is kept at "L" (logical value "0") up to the time t1 and kept at "H" (logical value "1") after the time t1. That is, the clock signal CK1 is supplied to the circuit block 610 up to the time t1 and supply of the clock signal CK 1 to the circuit block 610 is stopped after the time t1. A case (time t1 to time t4) is described below in which the circuit block 610 is accessed by the master block 101 while supply of a clock signal to the circuit block 610 is stopped.

At the time t1, the clock control signal CKSTOP1 of "H" (logical value "1") is output from the master block 101. Because the clock control signal CKSTOP1 becomes "H" (logical value "1"), the output signal CK1 of the OR circuit 106 is kept at "H". That is, because the clock control signal CKSTOP1 becomes "H" (logical value "1"), supply of the clock signal CK1 to the circuit block 610 is stopped. The circuit block 610 becomes an inactive state (not operating state) because supply of the clock signal CK1 is stopped. In this case, the SCK1 which is an output signal of the OR circuit 604 becomes a signal having the same waveform as the clock signal CLOCK because the clock control signal CKSTOP1 is inverted by the inverter 603.

At the time t2, an address signal ADDR corresponding to the slave block 502 and a write/read signal W/R for designating "write access" are output from the master slave 101. However, because the memory 610 is kept in an inactive state, it cannot capture data or cannot output a response signal RESP "10" (abnormal end "ERR") showing that write access is abnormal. In this case, the SELECT signal (result of decoding address signal ADDR) input to the stop control section 600 is kept at "H" (logical value "1").

At the time t3, an SRESP signal of "10" (abnormal end "ERR") is output from the selection circuit 602. This operation is described below in detail. The clock control signal CKSTOP1 of "H" (logical value "1") is inverted by the inverter 603 and input to the OR circuit 604 as a signal of "L" (logical value "0"). The OR circuit 604 performs the OR operation between an output signal of the inverter 603 and an clock signal CLOCK and outputs the signal SCK1 having the same waveform as the clock signal CLOCK to the F/F circuit 605. In this case, a SELECT signal of "H" (logical value "1") is input to the F/F circuit 605. The F/F circuit 605 captures the SELECT signal of "H" (logical value "1") at the rise of the SCK1 signal and outputs a signal of "H" (logical value "1") to the AND circuit 606. The AND circuit 606 performs the AND operation between an output signal of the F/F circuit 605 and a SELECT signal of "H" (logical value "1") and outputs a selection signal se1 of "H" (logical value "1") to a selection circuit 602. The selection circuit 602 outputs a SRESP signal of "10" (abnormal end "ERR") in response to a selection signal of "H" (logical value "1"). The OR circuit 607 outputs the SELECT signal of "10" (abnormal end "ERR") output from the selection circuit 602 as a response signal RESP.

At the time t4, the master block 101 stops outputting an address signal ADDR and write/read signal W/R corresponding to the slave block 502 in response to the response signal RESP of "10" (abnormal end "ERR") output from the stop control section 600 and completes the write access to the slave block 502.

As described above, the microcontroller of this embodiment has response means (the stop control section 600) for outputting a response signal RESP showing that a functional block (e.g. circuit block 610) to which supply of a clock signal is stopped is abnormally accessed instead of the circuit block. Therefore, when the functional block to which supply of a clock signal is stopped is accessed, it is possible to prevent the power when the master block 101 continues the access operation from being consumed and reduce the power consumption. Moreover, the microcontroller of this embodiment has response means for each of functional blocks (slave blocks 102 and 103), it is possible to set a different response signal every functional block and thereby, the versatility for controlling the microcontroller is improved.

Figure 8:
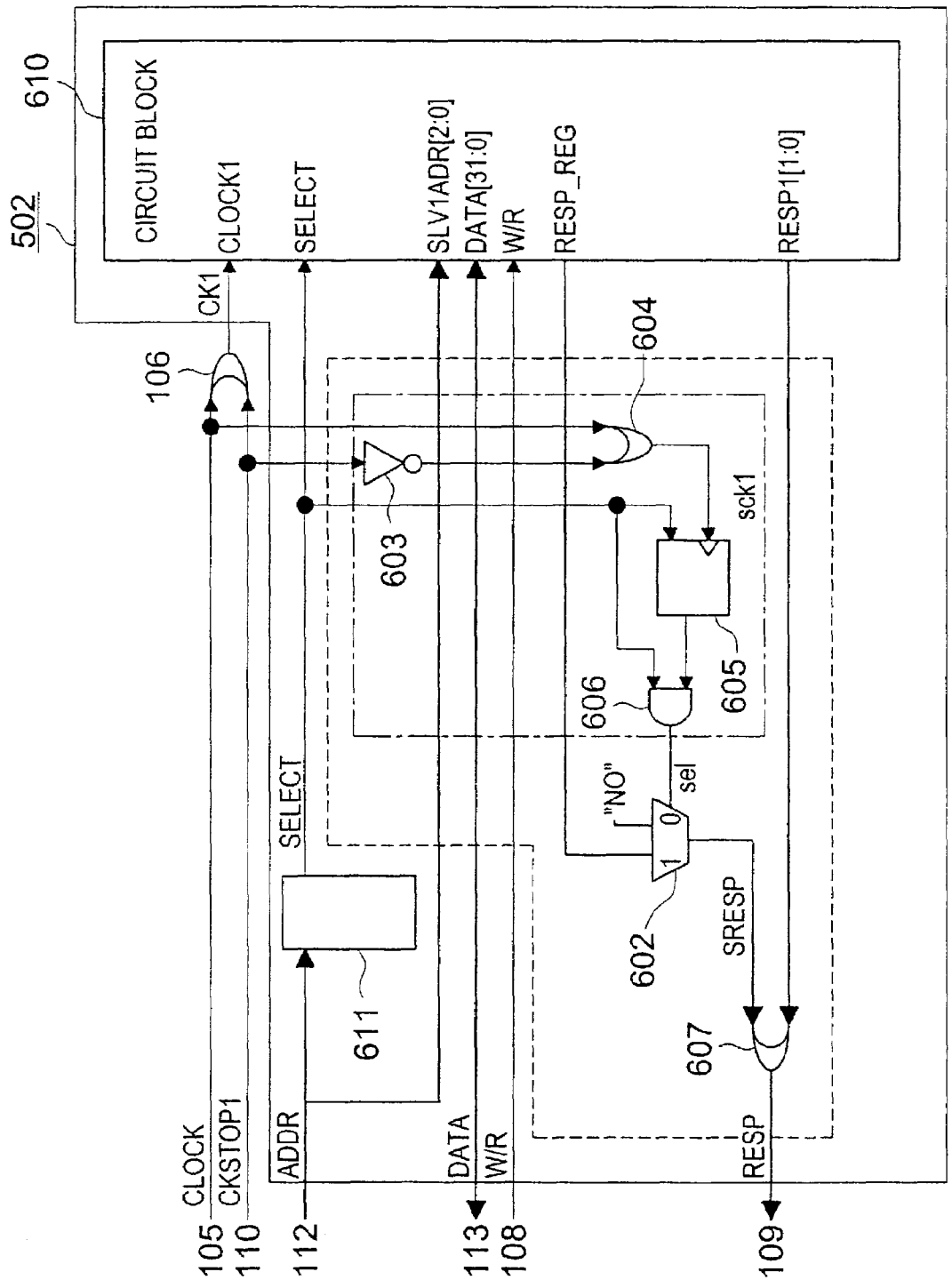
FIG. 8 is a circuit diagram showing another configuration of a stop control section of the microcontroller of the second embodiment of the present invention.

Another configuration of the stop control section of the microcontroller of this embodiment is described below. FIG. 8 is a circuit diagram showing another configuration of the stop control section of the microcontroller of the second embodiment of the present invention. The stop control section of the microcontroller of this embodiment is different from the stop control section shown in FIG. 6 in that an input signal of the selection circuit 602 is changed so that the signal is supplied from the circuit block 610. A signal to be input to the circuit block 602 is output from a RESP_REG terminal of the circuit block 610. It is possible to set a signal to be input to the selection circuit 602 to the circuit block 610 by inputting a program from an external unit.

What is claimed is:

1. A microcontroller comprising:
a plurality of functional blocks to which clock signals are supplied to execute predetermined functions;
clock-signal control means for selectively supplying the clock signals to the functional blocks in response to a clock control signal; and
response means for outputting a response signal showing that the functional blocks are abnormally accessed when the functional blocks to which supply of clock signals is stopped are accessed, wherein the response means is provided with a selection circuit for selecting and outputting either of an external program-preset first signal and a preset second signal in response to a selection signal.

2. A microcontroller comprising:
a plurality of functional blocks for executing predetermined functions;
a control block for controlling the functional blocks;
clock-signal control means for controlling supply/stop of a clock signal to the functional blocks in response to a clock control signal output from the control block; and
response means for designating a stop of access to one of the functional blocks when the one functional block to which supply of the clock signals is stopped is accessed, wherein the response means is provided with a selection circuit for selecting and outputting either of an external program-preset first signal and a preset second signal in response to a selection signal.

* * * * *